US011215284B2

(12) United States Patent
Ito et al.

(10) Patent No.: US 11,215,284 B2
(45) Date of Patent: Jan. 4, 2022

(54) SEALING APPARATUS (71) Applicant: NOK CORPORATION, Tokyo (JP)

(72) Inventors: Sosuke Ito, Fujisawa (JP); Masahiko Inoue, Fukushima (JP); Hisato Yonai, Fukushima (JP); Yuya Sakano, Fukushima (JP)

(73) Assignee: NOK Corporation, Tokyo (JP)

( * ) Notice: Subject to any disclaimer, the term of this patent is extended or adjusted under 35 U.S.C. 154(b) by 102 days.

(21) Appl. No.: 16/697,820

(22) Filed: Nov. 27, 2019

(65) Prior Publication Data

US 2020/0096112 A1 Mar. 26, 2020

Related U.S. Application Data (63) Continuation of application No. PCT/JP2018/021193, filed on Jun. 1, 2018.

(30) Foreign Application Priority Data

Jun. 2, 2017 (JP) .............................. JP2017-109912

(51) Int. Cl.
*F16J 15/3244* (2016.01)
*F16J 15/3204* (2016.01)

(52) U.S. Cl.
CPC ....... *F16J 15/3244* (2013.01); *F16J 15/3204* (2013.01)

(58) Field of Classification Search
CPC .. F16J 15/00; F16J 15/32; F16J 15/324; F16J 15/3244; F16J 15/3248; F16J 15/3252; F16J 15/3268; F16J 15/3204; F16J 15/3216

USPC ........................................................ 277/429
See application file for complete search history.

(56) References Cited

U.S. PATENT DOCUMENTS

| | | | |
|---|---|---|---|
| 6,170,834 B1 | 1/2001 | Vogt | |
| 9,638,324 B2 * | 5/2017 | Matsui | ................. F16J 15/3264 |
| 10,267,422 B2 * | 4/2019 | Yamaguchi | .......... F16J 15/3456 |
| 10,544,865 B2 * | 1/2020 | Sakano | ................. F16J 15/3204 |
| 2015/0276059 A1 | 10/2015 | Nakagawa | |
| 2015/0285379 A1 * | 10/2015 | Matsui | ................. F16J 15/002 277/351 |

(Continued)

FOREIGN PATENT DOCUMENTS

| | | |
|---|---|---|
| EP | 2 749 796 A1 | 7/2014 |
| EP | 2 913 565 A1 | 9/2015 |

(Continued)

OTHER PUBLICATIONS

Extended European Search Report dated Dec. 23, 2020 for corresponding European Application No. 18809887.5.

(Continued)

*Primary Examiner* — Nathan Cumar
(74) *Attorney, Agent, or Firm* — Pearne & Gordon LLP (57) ABSTRACT

A sealing apparatus 1 includes a sealing apparatus body 2 and a slinger 3. The sealing apparatus body 2 includes an annular reinforcing ring 10 and an annular elastic body portion 20. The slinger 3 includes a flange portion 31 which is an annular portion extending toward an outer periphery side. The elastic body portion 20 includes an annular end-face lip 21 extending toward an inner side and contacting an outer side surface 31*d* of the flange portion 31. At least one shallow groove 33 is formed on the outer side surface 31*d* of the flange portion 31 of the slinger 3.

4 Claims, 9 Drawing Sheets

(56) References Cited

U.S. PATENT DOCUMENTS

| | | | |
|---|---|---|---|
| 2017/0114901 A1 | 4/2017 | Yamanaka et al. | |
| 2018/0023707 A1* | 1/2018 | Yamaguchi | F16J 15/3244 |
| | | | 277/400 |
| 2018/0066757 A1 | 3/2018 | Sakano et al. | |
| 2018/0372222 A1 | 12/2018 | Nakagawa et al. | |

FOREIGN PATENT DOCUMENTS

| | | | |
|---|---|---|---|
| EP | 3 156 699 A1 | 4/2017 | |
| EP | 3156699 A1 * | 4/2017 | F16J 15/3204 |
| EP | 3 382 241 A1 | 10/2018 | |
| JP | 56-153155 A | 11/1981 | |
| JP | 04-088773 U | 7/1992 | |
| WO | 2016/111303 A1 | 7/2016 | |
| WO | 2016/158718 A1 | 10/2016 | |
| WO | 2017/090583 A1 | 6/2017 | |

OTHER PUBLICATIONS

International Search Report for corresponding International Application No. PCT/JP2018/021193 dated Aug. 21, 2018.
Written Opinion for corresponding International Application No. PCT/JP2018/021193 dated Aug. 21, 2018.
Korean Office Action dated Apr. 23, 2021 for corresponding Korean Application No. 10-2019-7037683 and English translation.
International Preliminary Report on Patentability for corresponding International Application No. PCT/JP2018/021193 dated Dec. 3, 2019.
English translation of Written Opinion for corresponding International Application No. PCT/JP2018/021193 dated Aug. 21, 2018.
First Office Action dated Sep. 27, 2020 for corresponding Chinese Application No. 201880036687.0 and English translation.
Second Office Action dated Sep. 3, 2021 for corresponding Chinese Application No. 201880036687.0 and English translation.
Notice of Final Rejection dated Oct. 20, 2021 for corresponding Korean Application No. 10-2019-7037683 and English translation.

* cited by examiner

SEALING APPARATUS

CROSS REFERENCE TO RELATED APPLICATIONS

The present application is a continuation application of International Patent Application No. PCT/JP2018/021193 filed on Jun. 1, 2018, which claims the benefit of Japanese Patent Application No. 2017-109912, filed on Jun. 2, 2017. The contents of these applications are incorporated herein by reference in their entirety.

BACKGROUND

Technical Field

The present disclosure relates to a sealing apparatus to realize sealing between a shaft and a hole into which this shaft is to be inserted.

Background

In a vehicle, general-purpose machine, or the like, in order to prevent leakage of a target to be sealed such as, for example, a lubricant, and in order to seal a gap between a shaft and a hole into which this shaft is to be inserted, a sealing apparatus has been conventionally used. In such a sealing apparatus, sealing between the shaft and the sealing apparatus is realized by a seal lip being brought into contact with the shaft or an annular member attached to the shaft. Among such sealing apparatuses, there is a so-called end-face contact-type sealing apparatus. The end-face contact-type sealing apparatus prevents leakage of a target to be sealed by bringing a seal lip extending along a shaft into contact with a slinger attached to the shaft.

Among conventional end-face contact-type sealing apparatuses, there is an apparatus in which sealing properties are improved by providing grooves at a slinger that a seal lip contacts and sending a target to be sealed such as oil to a side of the target to be sealed along with air on an atmosphere side by pumping action of the grooves while the slinger is rotating. In such a conventional end-face contact-type sealing apparatus, while a target to be sealed which has oozed can be returned to the side of the target to be sealed by the pumping action while the slinger is rotating as described above, when the slinger is stopped, there is a case where so-called static leakage which is leakage of the target to be sealed from a gap formed between the groove of the slinger and an end-face lip, may occur.

To prevent this static leakage, among conventional end-face contact-type sealing apparatuses, there is an apparatus in which a seal lip which contacts a slinger is further provided on an inner periphery side of a seal lip to prevent a target to be sealed which has oozed by static leakage occurring at the seal lip on an outer periphery side from further leaking to outside (see, for example, Japanese Utility Model Laid Open No. 4-88773).

SUMMARY

In such a conventional end-face contact-type sealing apparatus, while static leakage is prevented by the seal lip on the inner periphery side as described above, two seal lips contact the slinger, which increases sliding resistance with respect to a shaft while the slinger is rotating. In recent years, in a sealing apparatus, it is required to reduce sliding resistance with respect to the shaft to meet a demand for reducing fuel consumption of a vehicle, or the like, and in an end-face contact-type sealing apparatus, a structure is required which can reduce sliding resistance with respect to the shaft while preventing static leakage.

The present disclosure is related to providing a sealing apparatus which can prevent static leakage of a target to be sealed without increasing sliding resistance with respect to a shaft.

In accordance with one aspect of the present disclosure, there is provided a sealing apparatus for sealing an annular gap between a shaft and a hole into which the shaft is to be inserted. The sealing apparatus includes a sealing apparatus body fitted into the hole, and a slinger attached to the shaft. The sealing apparatus body includes a reinforcing ring annular around an axis line, and an elastic body portion which is formed with an elastic body attached to the reinforcing ring and which is annular around the axis line. The slinger including a flange portion which is a portion extending toward an outer periphery side and annular around the axis line. The elastic body portion includes an end-face lip. The end face lip is a lip extending toward one side in an axis line direction and contacts a surface of the flange portion on another side in the axis line direction. The end face lip is annular around the axis line. At least one shallow groove is formed on the surface of the flange portion of the slinger on the other side.

In a sealing apparatus according to one aspect of the present disclosure, the slinger has a plurality of shallow grooves.

In a sealing apparatus according to one aspect of the present disclosure, a depth of each of the grooves is equal to or less than 15 μm.

In a sealing apparatus according to one aspect of the present disclosure, a depth of each of the grooves is equal to or less than 10 μm.

In a sealing apparatus according to one aspect of the present disclosure, the groove intersects with a portion where the seal lip contacts.

According to a sealing apparatus according to the present disclosure, it is possible to prevent static leakage of a target to be sealed without increasing sliding resistance with respect to a shaft.

BRIEF DESCRIPTION OF DRAWINGS

FIGS. 4A and 4B are diagrams for explaining shapes of grooves.

FIGS. 6A and 6B are diagrams for illustrating modified examples of the grooves of the slinger in the sealing apparatus, FIG. 6A illustrates one modified example of the grooves.

DESCRIPTION OF EMBODIMENTS

Embodiments of the present disclosure will be described blow with reference to the drawings.

Figure 1:
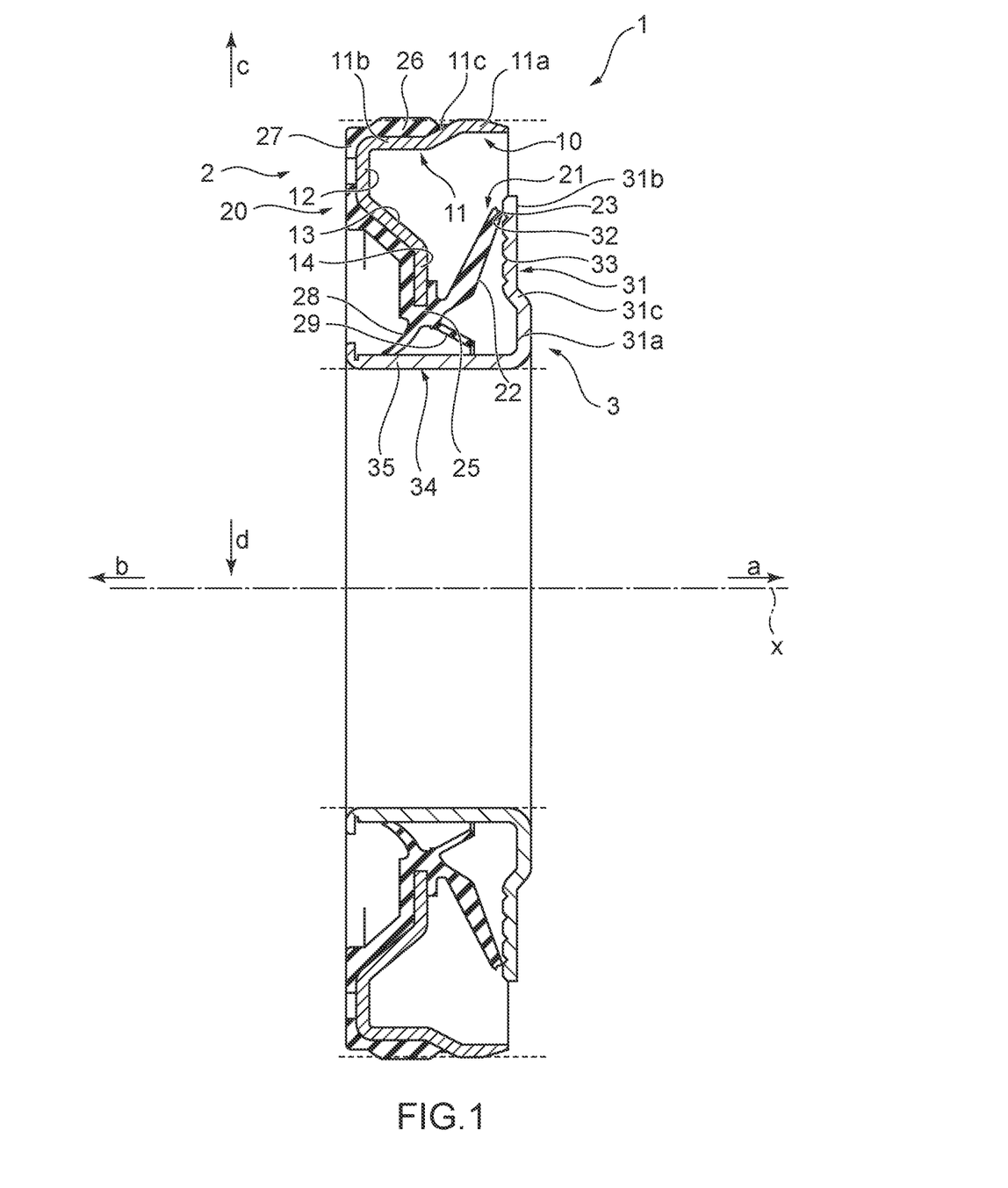
FIG. 1 is a cross-sectional diagram on a cross-section along an axis line for illustrating a schematic configuration of a sealing apparatus according to an embodiment of the present disclosure.
Figure 2:
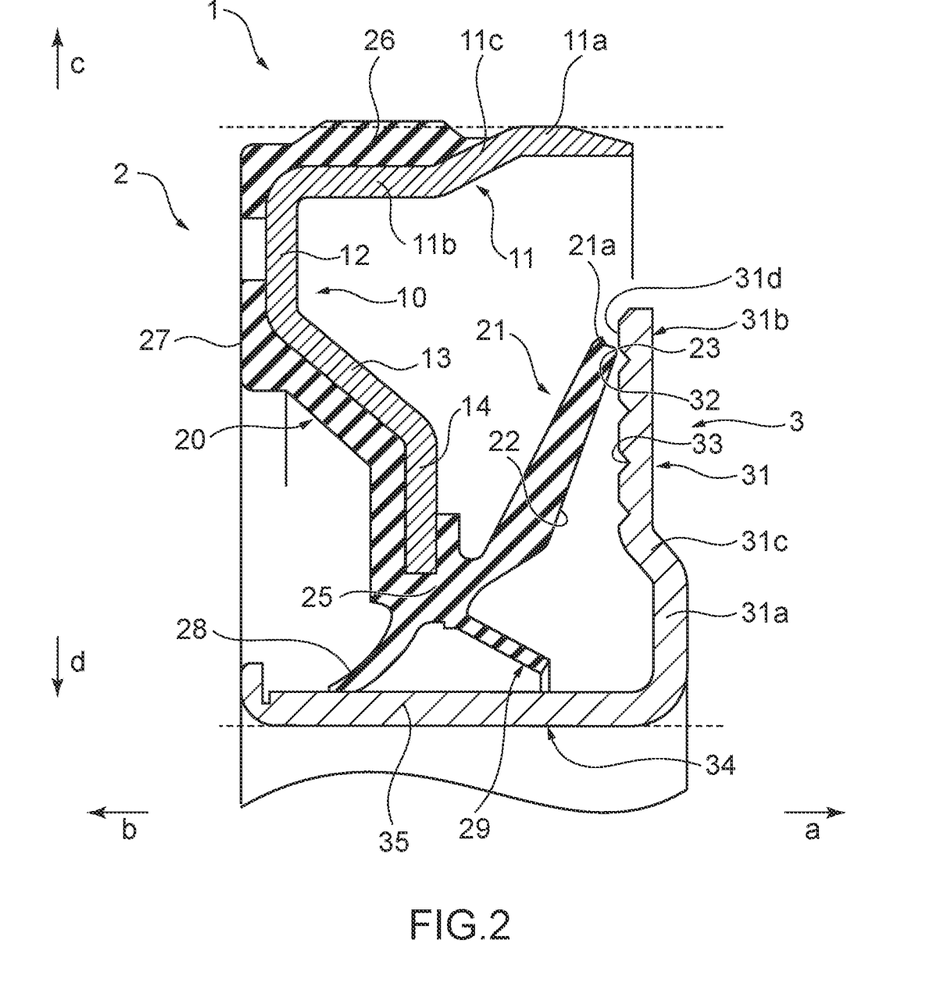
FIG. 2 is a partially enlarged cross-sectional diagram illustrating enlarged part of the cross-section along the axis line of the sealing apparatus according to the embodiment of the present disclosure.

FIG. 1 is a cross-sectional diagram on a cross-section along an axis line x for illustrating a schematic configuration of a sealing apparatus 1 according to an embodiment of the present disclosure, and FIG. 2 is a partially enlarged cross-sectional diagram illustrating enlarged part of the cross-section along the axis line x of the sealing apparatus 1 according to the embodiment of the present disclosure.

The sealing apparatus 1 according to the present embodiment is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted in a vehicle or general-purpose machine. For example, the sealing apparatus is used to seal annular space between a crank shaft of an engine and a crank hole which is a shaft hole formed at a front cover or a cylinder block and a crank case. Note that targets to which the sealing apparatus 1 according to the embodiment of the present disclosure is applied are not limited to the above.

In the following description, for the purpose of convenience of the description, a direction of an arrow a (see FIG. 1) in the direction of the axial direction x (one side in the axis line direction) is set as an inner side, and a direction of an arrow b (see FIG. 1) in the axis line x direction (another side in the axis line direction) is set as an outer side. More specifically, the inner side is a side of space to be sealed (side of a target to be sealed) and a side of space where a target to be sealed such as a lubricant exists, and the outer side is an opposite side of the inner side. Further, in a direction perpendicular to the axis line x (hereinafter, also referred to as a "radial direction"), a direction away from the axis line x (a direction of an arrow c in FIG. 1) is set as an outer periphery side, and a direction approaching the axis line x (a direction of an arrow d in FIG. 1) is set as an inner periphery side.

As illustrated in FIG. 1, the sealing apparatus 1 includes a sealing apparatus body 2 fitted into a hole as an attachment target which will be described later and a slinger 3 attached to a shaft as an attachment target which will be described later. The sealing apparatus body 2 includes a reinforcing ring 10 which is annular around the axis line x, and an elastic body portion 20 which is formed with an elastic body attached to the reinforcing ring 10, and which is annular around the axis line x. The slinger 3 includes a flange portion 31 which is a portion extending toward the outer periphery side (the direction of the arrow c) and annular around the axis line x. The elastic body portion 20 includes an end-face lip 21 which is a lip extending toward one side (inner side, the direction of the arrow a) in the axis line x direction, contacting a surface (outer side surface 31d) of the flange portion 31 on the other side (outer side, a side of the direction of the arrow b) in the axis line direction x and which is annular around the axis line x. At least one shallow groove 33 is formed on the outer side surface 31d of the flange portion 31 of the slinger 3. The respective configurations of the sealing apparatus body 2 and the slinger 3 of the sealing apparatus 1 will be specifically described below.

As illustrated in FIG. 1 and FIG. 2, in the sealing apparatus body 2, the reinforcing ring 10 is an annular metal member which is centered on or substantially centered on the axis line x and is formed so that the sealing apparatus body 2 is pressed, engaged and fitted into a shaft hole of a housing which will be described later. The reinforcing ring 10 includes, for example, a cylindrical portion 11 which is a cylindrical portion located on the outer periphery side, a disk portion 12 which is a hollow disk-shaped portion extending from a tip portion on the outer side of the cylindrical portion 11 to the inner periphery side, a conical ring portion 13 which is a conical cylindrical annular portion extending from a tip portion on the inner periphery side of the disk portion 12 to the inner side and the inner periphery side, and a disk portion 14 which is a hollow disk-shaped portion extending in the radial direction from a tip portion on the inner side or the inner periphery side of the conical ring portion 13 to the inner periphery side and reaching a tip portion on the inner periphery side of the reinforcing ring 10. More specifically, the cylindrical portion 11 of the reinforcing ring 10 includes an outer periphery side cylindrical portion 11a which is a cylindrical or substantially cylindrical portion located on the outer periphery side, an inner periphery side cylindrical portion 11b which is a cylindrical or substantially cylindrical portion extending on the outer side and the inner periphery side of the outer periphery side cylindrical portion 11a, and a connecting portion 11c which is a portion connecting the outer periphery side cylindrical portion 11a and the inner periphery side cylindrical portion 11b. The outer periphery side cylindrical portion 11a of the cylindrical portion 11 is fitted into the shaft hole 51 so that, when the sealing apparatus body 2 is fitted into the shaft hole 51 of the housing 50 (FIG. 3) which will be described later, the axis line x of the sealing apparatus body 2 matches an axis line of the shaft hole 51. The elastic body portion 20 is attached to the reinforcing ring 10 from a substantially outer periphery side and the outer side, so as to reinforce the elastic body portion 20 with the reinforcing ring 10.

As illustrated in FIG. 1 and FIG. 2, the elastic body portion 20 includes a base portion 25 which is a portion attached to a tip portion on the inner periphery side of the disk portion 14 of the reinforcing ring 10, a gasket portion 26 which is a portion attached to the cylindrical portion 11 of the reinforcing ring 10 from the outer periphery side, and a rear cover portion 27 which is a portion attached to the reinforcing ring 10 between the base portion 25 and the gasket portion 26 from the outer side. More specifically, as illustrated in FIG. 2, the gasket portion 26 is attached to the inner periphery side cylindrical portion 11b of the cylindrical portion 11 of the reinforcing ring 10. Further, an outer diameter of the gasket portion 26 is greater than a diameter of an inner periphery surface 51a (see FIG. 5) of the shaft hole 51 which will be described later. Therefore, in the case where the sealing apparatus body 2 is fitted into the shaft hole 51 which will be described later, the gasket portion 26 is compressed in the radial direction between the inner periphery side cylindrical portion 11b of the reinforcing ring 10 and the shaft hole 51 and seals a gap between the shaft hole 51 and the inner periphery side cylindrical portion 11b of the reinforcing ring 10. By this means, space between the sealing apparatus body 2 and the shaft hole 51 is sealed. The gasket portion 26 does not have to be have an outer diameter greater than the diameter of the inner periphery surface of the shaft hole 51 over the whole axis line x direction, and may have the outer diameter partially greater than the diameter of the inner periphery surface of the shaft hole 51. For example, an annular convex portion whose tip has a diameter greater than the diameter of the inner periphery surface 51a of the shaft hole 51 may be formed on a surface on the outer periphery side of the gasket portion 26.

Further, at the elastic body portion 20, the end-face lip 21 extends from the base portion 25 to the inner side (direction of the arrow a) in an annular shape centered on or substantially centered on the axis line x. The end-face lip 21 is formed so that a slinger contact portion 23 on an inner periphery surface 22, which is a surface of the end-face lip 21 on the inner periphery side, contacts the flange portion 31 of the slinger 3 from the outer side with a predetermined interference, in a usage state where the sealing apparatus 1 is attached at a desired position in the attachment target. The end-face lip 21 has, for example, a conical cylindrical shape whose diameter becomes greater toward the inner side (direction of the arrow a) in the axis line x direction. That is, as illustrated in FIG. 1 and FIG. 2, the end-face lip 21 extends obliquely with respect to the axis line x from the base portion 25 to the inner side and the outer periphery side on a cross-section along the axis line x (hereinafter, also simply referred to as a "cross-section").

Further, the elastic body portion 20 includes a dust lip 28 and an intermediate lip 29. The dust lip 28 is a lip extending from the base portion 25 toward the axis line x, extends from the base portion 25 in an annular shape centered on or substantially centered on the axis line x, and is formed so that, in the usage state of the sealing apparatus 1 which will be described later, a tip portion contacts the slinger 3 from the outer periphery side with a predetermined interference. The dust lip 28 has, for example, a conical cylindrical shape whose diameter becomes smaller toward the outer side (direction of the arrow b) in the axis line x direction. The dust lip 28 prevents a foreign matter such as dust and moisture from intruding inside of the sealing apparatus 1 from the outer side which is the opposite side of the side of the target to be sealed in the usage state. The dust lip 28 may be formed so as not to contact the slinger 3 in the usage state of the sealing apparatus 1.

As illustrated in FIG. 2, the intermediate lip 29, which is a lip extending from the base portion 25 toward the inner side to have a substantially L shape in cross section, extends from the base portion 25 in an annular shape centered on or substantially centered on the axis line x direction, and forms an annular concave portion which opens toward the inner side between the intermediate lip 29 and the base portion 25. The intermediate lip 29 does not contact the slinger 3 in the usage state of the sealing apparatus 1. The intermediate lip 29 is formed to, in the usage state, in the case where a target to be sealed oozes inside over the slinger contact portion 23 where the end-face lip 21 contacts the slinger 3, prevent this target to be sealed which has oozed from leaking out on the dust lip 28 side. The intermediate lip 29 may have other shapes, and may, for example, have a conical cylindrical shape whose diameter becomes smaller toward the inner side in the axis line x direction. The intermediate lip 29 may be formed so that a tip of the intermediate lip 29 contacts the slinger 3.

As described above, the elastic body portion 20 includes the end-face lip 21, the base portion 25, the gasket portion 26, the rear cover portion 27, the dust lip 28 and the intermediate lip 29, respective portions are integrated, and the elastic body portion 20 is integrally formed with the same material. Note that the shape of the elastic body portion 20 is not limited to the above-described shape, and may be various shapes in accordance with application targets.

The above-described reinforcing ring 10 is formed with a metal material, and examples of this metal material can include, for example, stainless steel and SPCC (cold rolled steel sheet). Further, examples of the elastic body of the elastic body portion 20 can include, for example, various kinds of rubber materials. The various kinds of rubber materials can include, for example, synthetic rubber such as nitrile rubber (NBR), hydrogenated nitrile rubber (H-NBR), acryl rubber (ACM) and fluorine-containing rubber (FKM).

The reinforcing ring 10 is manufactured through, for example, press work or forging, and the elastic body portion 20 is molded through cross-linking (vulcanization) molding using a mold. Upon this cross-linking molding, the reinforcing ring 10 is disposed in the mold, the elastic body portion 20 is adhered to the reinforcing ring 10 through cross-linking adhesion, and the elastic body portion 20 and the reinforcing ring 10 are integrally molded.

The slinger 3 is an annular member attached to the shaft in the usage state of the sealing apparatus 1 which will be described later, and is an annular member centered on or substantially centered on the axis line x. The slinger 3 has a cross-section having a substantially L shape, and includes the flange portion 31 and the cylindrical or substantially cylindrical tubular portion 34 which is connected to an end portion on the inner periphery side of the flange portion 31 and which extends in the axis line x direction.

The flange portion 31 specifically includes an inner periphery side disk portion 31a having a hollow disk shape or a substantially hollow disk shape extending from the tubular portion 34 in the radial direction, an outer periphery side disk portion 31b in a hollow disk shape or a substantially hollow disk shape which expands on the outer periphery side of the inner periphery side disk portion 31a and which extends in the radial direction, and a connecting portion 31c which connects an end portion on the outer periphery side of the inner periphery side disk portion 31a and an end portion on the inner periphery side of the outer periphery side disk portion 31b. The outer periphery side disk portion 31b is located outer side of the inner periphery side disk portion 31a in the axis line x direction. Note that the shape of the flange portion 31 is not limited to the above-described shape, and may be various shapes in accordance with an application target. For example, the flange portion 31 does not have to include the inner periphery side disk portion 31a and the connecting portion 31c, and the outer periphery side disk portion 31b may extend to the tubular portion 34 and may be connected to the tubular portion 34, and may be a portion in a hollow disk shape or a substantially hollow disk shape extending from the tubular portion 34 in the radial direction.

A lip contact portion 32 which is a portion where the slinger 3 contacts the end-face lip 21 is located on the outer side surface 31d which is a surface facing the outer side of the outer periphery side disk portion 31b at the flange portion 31. It is preferable that the outer side surface 31d is a surface along a plane expanding in the radial direction.

As described above, at least one shallow groove 33 is formed on the outer periphery surface 31d of the slinger 3.

Figure 3:
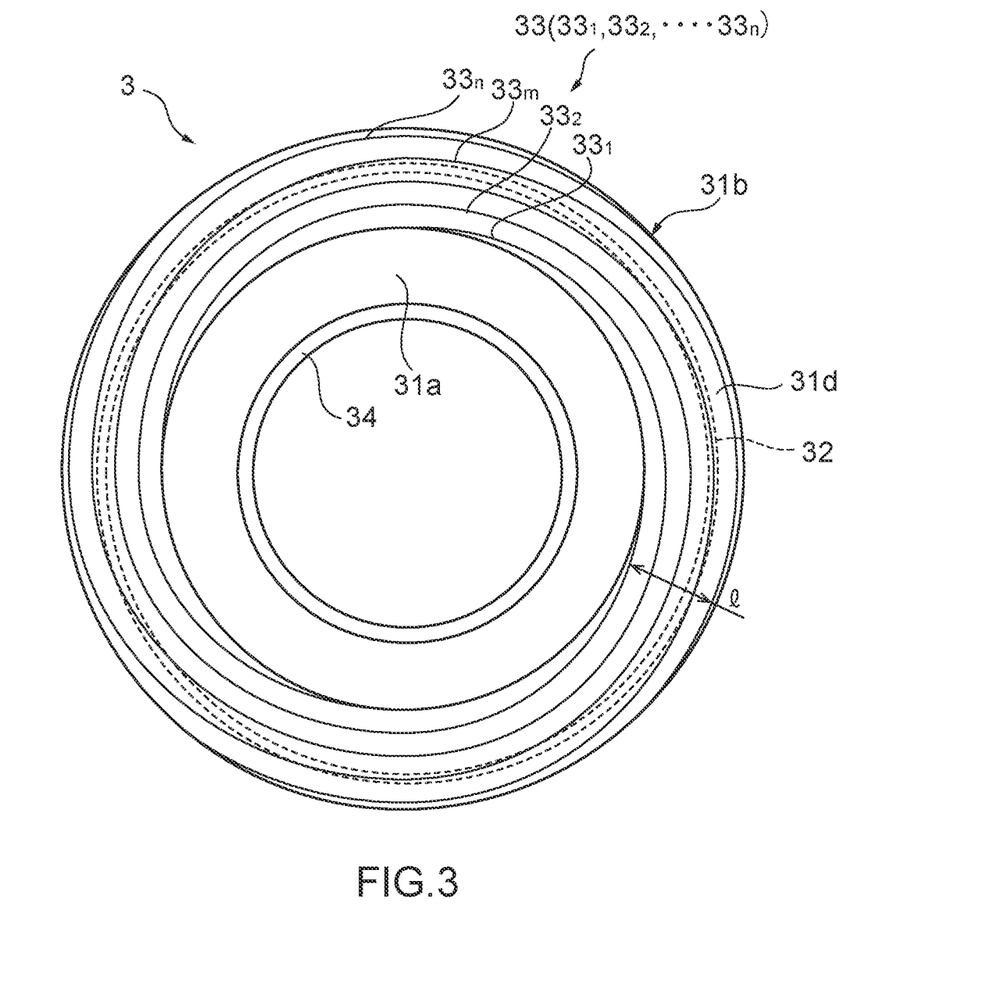
FIG. 3 is a side view of a slinger in the sealing apparatus according to the embodiment of the present disclosure, seen from outside.

In the present embodiment, as illustrated in FIG. 3, a plurality of grooves 33 are formed on the outer periphery surface 31*d* of the slinger 3. FIG. 3 is a side view of the slinger 3 in the sealing apparatus 1, seen from outside. As illustrated in FIG. 3, n grooves 33 of $33_1, 33_2, 33_3, \ldots, 33_n$ are formed on the outer periphery surface 31*d* of the slinger 3. That is, the number of grooves 33 (number of threads) of the slinger 3 is n. As illustrated in FIG. 3, each groove $33_m$ (m=1, 2, 3, . . . , n) of the plurality of grooves $33_1$ to $33_n$ intersects with a portion where the end-face lip 21 contacts. Specifically, the groove $33_m$ extends between the inner periphery side and the outer periphery side, and intersects with the lip contact portion 32 which is the contact portion with the end-face lip 21 on the outer side surface 31*d* of the outer side disk portion 31*b* of the flange portion 31.

Figure 4A:
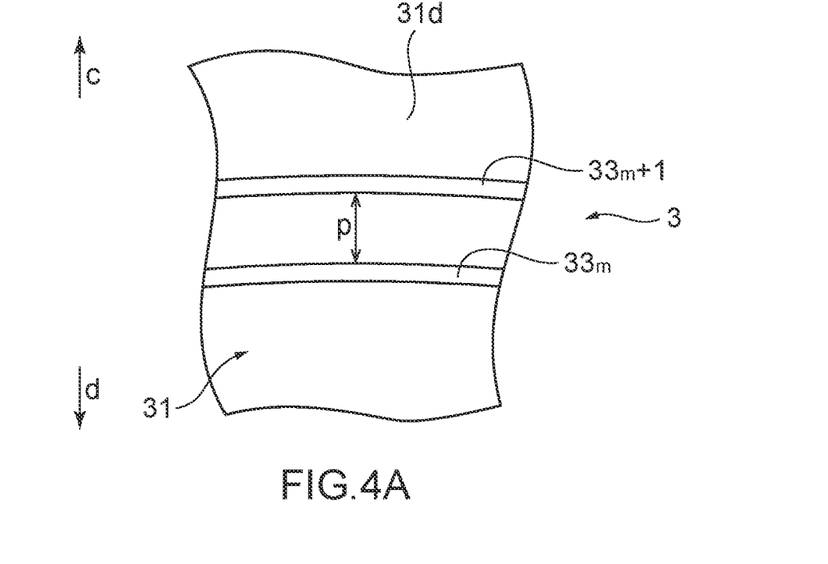
FIG. 4A illustrates a partially enlarged side view of the slinger when grooves adjacent to each other are seen from outside.
Figure 4B:
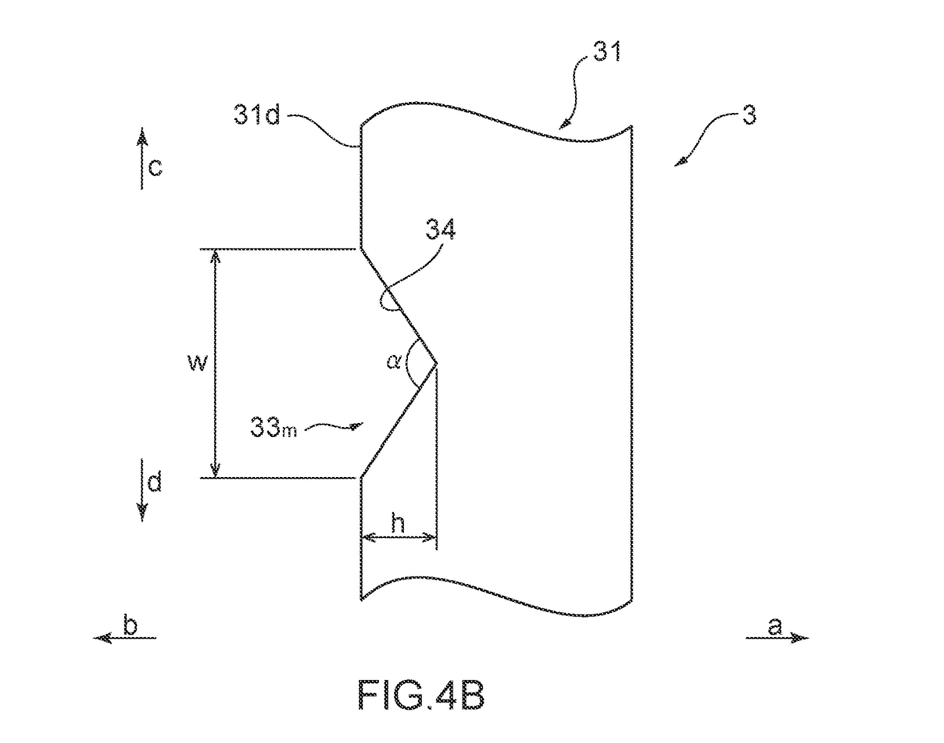
FIG. 4B illustrates a partially enlarged cross-sectional diagram of the slinger illustrating shapes of the grooves on a cross-section along the axis line.

FIGS. 4A and 4B are diagrams for explaining a shape of the groove $33_m$ (m=1 to n), FIG. 4A is a partially enlarged side view of the slinger 3 when the grooves $33_m$, $33_{m+1}$ (m=1 to n) adjacent to each other are seen from the outside, and FIG. 4B is a partially enlarged cross-sectional diagram of the slinger 3 illustrating a shape of the groove $33_m$ (m=1 to n) on a cross-section along the axis line x. As illustrated in FIG. 4A, a pitch which is an interval in the radial direction between the groove $33_m$ and the groove $33_{m+1}$ which are adjacent to each other and which are different from each other is a pitch p. Further, as illustrated in FIG. 3, the groove $33_m$ extends in a spiral manner (swirl shape), and a lead of the groove $33_m$ is a lead l. Note that the lead is a width which the groove $33_m$ expands in the radial direction when the groove $33_m$ goes around. Further, as illustrated in FIG. 4B, the groove $33_m$ is a groove which is concave inward, and, for example, a bottom surface 33*a* has outline in a v shape or substantially v shape. A narrow angle of the bottom surface 33*a* is a narrow angle α. Further, a depth of the groove $33_m$ is a depth h, and a width in a circumferential direction of the groove $33_m$ is a width w.

Figure 5:
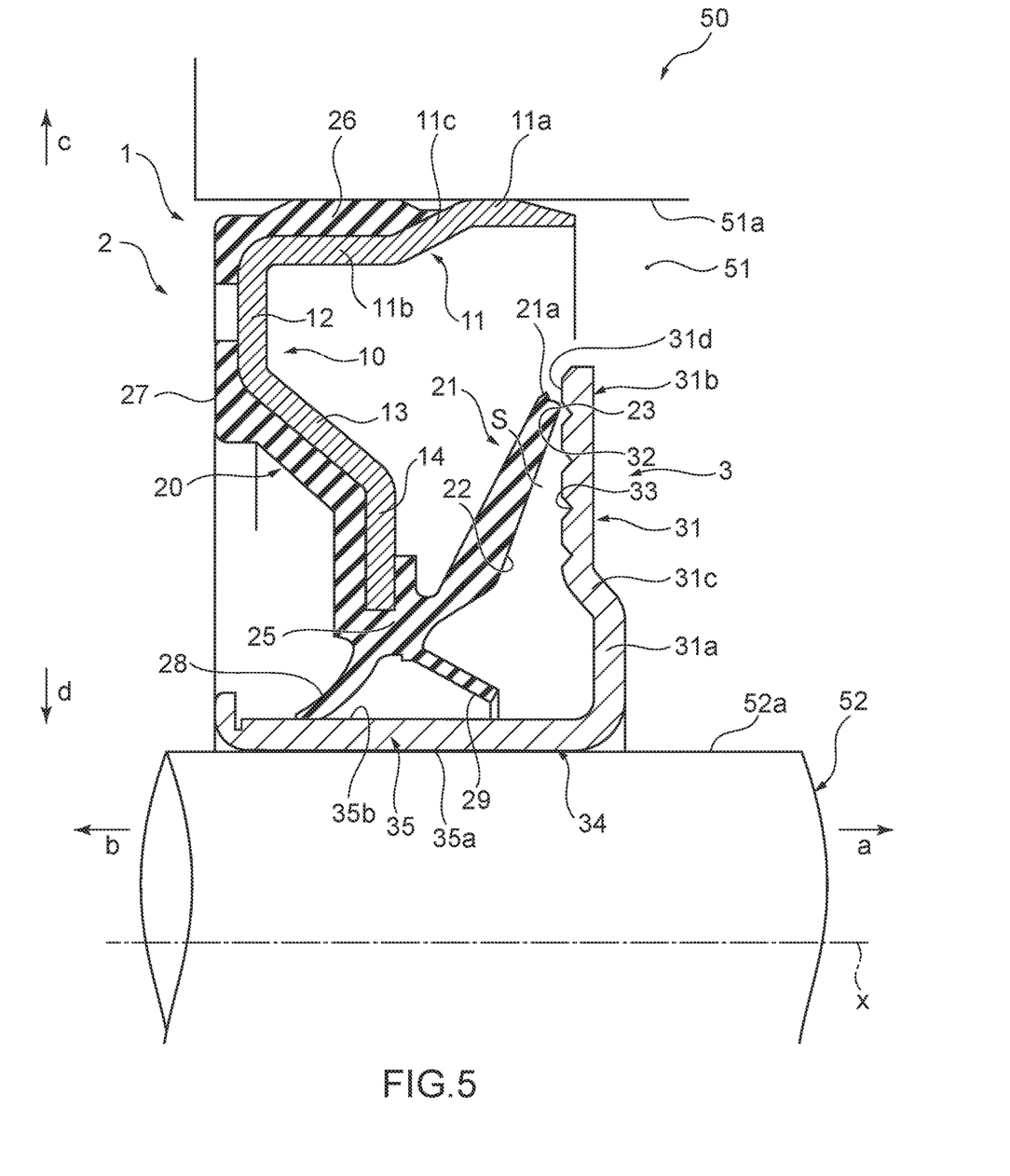
FIG. 5 is a partially enlarged cross-sectional diagram of the sealing apparatus in a usage state where the sealing apparatus illustrated in FIG. 1 is attached to a housing as an attachment target and a shaft inserted into a shaft hole which is a through-hole formed at this housing.

Action of the sealing apparatus 1 having the above-described configuration will be described next. FIG. 5 is a partially enlarged cross-sectional diagram of the sealing apparatus 1 in the usage state where the sealing apparatus 1 is attached to the housing 50 as the attachment target and the shaft 52 inserted into the shaft hole 51 which is the through-hole formed at the housing 50. The housing 50 is, for example, a front cover of an engine or a cylinder block and a crank case, and the shaft hole 51 is a crank hole formed at the front cover, or the cylinder block and the crank case. Further, the shaft 52 is, for example, a crank shaft.

As illustrated in FIG. 5, in the usage state of the sealing apparatus 1, the sealing apparatus body 2 is fitted into the shaft hole 51 by being pressed into the shaft hole 51, and the slinger 3 is attached to the shaft 52 by being interference-fitted at the shaft 52. More specifically, the outer periphery side cylindrical portion 11*a* of the reinforcing ring 10 contacts the inner periphery surface 51*a* of the shaft hole 51, so that a shaft center of the sealing apparatus body 2 is made to match a shaft center of the shaft hole 51, and the gasket portion 26 is tightly adhered to the inner periphery surface 51*a* of the shaft hole 51 by the gasket portion 26 of the elastic body portion 20 being compressed in the radial direction between the inner periphery surface 51*a* of the shaft hole 51 and the inner periphery side cylindrical portion 11*b* of the reinforcing ring 10, so that sealing between the sealing apparatus body 2 and the shaft hole 51 is realized. Further, the cylindrical portion 35 of the slinger 3 is pressed into the shaft 52, and the inner periphery surface 35*a* of the cylindrical portion 35 is tightly adhered to the outer periphery surface 52*a* of the shaft 52, so that the slinger 3 is fixed at the shaft 52.

In the usage state of the sealing apparatus 1, relative positions between the sealing apparatus body 2 and the slinger 3 in the axis line x direction are determined so that the end-face lip 21 of the elastic body portion 20 contacts the lip contact portion 32 which is a portion of the outer side surface 31*d* of the outer periphery side disk portion 31*b* of the flange portion 31 of the slinger 3 at the slinger contact portion 23 which is a portion of the inner periphery surface 22 on a the tip 21*a* side. A gap between the sealing apparatus body 2 and the slinger 3 is sealed by the end-face lip 21 contacting the flange portion 31, and leakage of the target to be sealed from the side of the target to be sealed is prevented. Further, the dust lip 28, at its portion on the tip side, contacts the cylindrical portion 34 of the slinger 3 from the outer periphery side. The dust lip 28, for example, contacts the outer periphery surface 35*b* of the cylindrical portion 35 of the slinger 3.

Further, in the usage state of the sealing apparatus, the plurality of grooves 33 formed at the outer periphery side disk portion 31*b* of the flange portion 31 of the slinger 3 provides pumping action in the case where the shaft 52 (slinger 3) rotates. By rotation of the shaft 52 (slinger 3), pumping action occurs in a region in the vicinity of the slinger contact portion 23 and the lip contact portion 32 in narrow space S which is space between the flange portion 31 and the end-face lip 21. By this pumping action, even in the case where the target to be sealed oozes from the target to be sealed side to the narrow space S, the target to be sealed which has oozed is returned from the narrow space S to the target to be sealed side beyond the slinger contact portion 23 and the lip contact portion 32. In this manner, by the pumping action occurring by the groove 33 formed at the flange portion 31 of the slinger 3, ooze of the target to be sealed to the narrow space S is suppressed.

Further, as described above, the grooves 33 intersect with the lip contact portion 32 which is the portion where the end-face lip 21 contacts the slinger 3, between the inner periphery side and the outer periphery side, and a gap extending between the inner periphery side and the outer periphery side is formed by the grooves 33, between the slinger contact portion 23 and the lip contact portion 32 which contact with each other. Therefore, in a state where the sealing apparatus 1 is at rest, while the shaft 52 is at rest, that is, the slinger 3 is at rest, it is considered that static leakage in which the target to be sealed oozes from the target to be sealed side through the grooves 33 may occur. However, in the present sealing apparatus 1, the grooves 33 formed at the slinger 3 are shallow grooves as described above, and the depth h of the grooves 33 is a small value. Therefore, in the rest state of the sealing apparatus 1, occurrence of static leakage is prevented.

Further, it is conventionally known that pumping action based on the grooves of the slinger is reduced as rotation of the slinger becomes faster. It can be considered that this is because the pumping region contracts toward the side of the slinger contact portion and the lip contact portion as the rotation speed of the slinger becomes higher. Meanwhile, in the sealing apparatus 1, because a value of the pitch p is small, and a number of grooves 33 are formed at the slinger 3, even in the case where rotation of the slinger 3 becomes faster, and the pumping action of the respective grooves 33 of the slinger 3 is reduced, it is possible to secure a pumping amount required for preventing ooze of the target to be sealed by the pumping action based on a number of grooves 33 formed at the slinger 3. Further, because a number of grooves 33 are formed at the slinger 3, it is possible to improve pumping action based on the grooves 33 of the slinger 3 regardless rotational speed of the slinger 3.

Sealing performance of the sealing apparatus 1 according to the embodiment of the present disclosure will be described next. Specifically, static leakage prevention performance of the sealing apparatus 1 will be described.

The present inventor manufactured the sealing apparatuses 1 according to the above-described embodiment of the present disclosure which have grooves 33 whose depths h, narrow angles α of bottom surfaces 33a, leads 1 and the number of threads n are different from each other (test examples 1 to 5) and performed evaluation tests of static leakage prevention performance of the sealing apparatuses 1. In the test example 1, the grooves 33 were set such that the depth h=8 μm, the lead l=5.6 mm, and the number of threads n=73. In the test example 2, the grooves 33 were set such that the depth h=8 μm, the lead l=10 mm, and the number of threads n=99. In the text example 3, the grooves 33 were set such that the depth h=13 μm, the lead l=5.6 mm, and the number of threads n=24. In the test example 4, the grooves 33 were set such that the depth h=16 μm, the lead l=10 mm, and the number of threads n=43. In the test example 5, the grooves 33 were set such that the depth h=26 μm, the lead l=5.6 mm, and the number of threads n=24. Further, in all the test examples 1 to 5, the narrow angle α=165°.

The evaluation tests were performed under the following test conditions.

[Test Conditions]

Shaft eccentricity of the shaft 52: 0 mm T. I. R. (Total Indicator Reading) Eccentricity of attachment (eccentricity of the shaft hole 51): 0 mm T. I. R. (Total Indicator Reading)

Plane deflection of the slinger 3: 0 mm (target value of processing)

Oil temperature: 40° C.

Oil type: OW-8 (based on SEA standards, SAEJ300 engine oil viscosity classification (2015, January))

Oil amount: fullness

Rotational speed of the shaft 52 (slinger 3): 0 rpm

The evaluation tests were performed by measuring a period until occurrence of leakage under the above-described test conditions was confirmed up to 1,000 hours. Further, the evaluation tests were performed at the evaluation apparatus in which a usage state as illustrated in FIG. 5 was created in a pseudo manner. In this evaluation apparatus, oil as the above-described target to be sealed was poured on the target to be sealed side, so that the whole of the sealing apparatus 1 was covered with the oil on the target to be sealed side.

Results of the evaluation tests of static leakage prevention performance are indicated in Table 1 below.

TABLE 1

| | Test example 1 | Test example 2 | Test example 3 | Test example 4 | Test example 5 |
|---|---|---|---|---|---|
| Depth h (μm) | 8 | 8 | 13 | 16 | 26 |
| Narrow angle α (°) | 165 | 165 | 165 | 165 | 165 |
| Lead l (mm) | 5.6 | 10 | 5.6 | 10 | 5.6 |
| The number of threads n | 73 | 99 | 24 | 43 | 24 |
| Leakage occurrence period (hr) | No leakage | No leakage | 550 | 110 | 34 |

As indicated in Table 1, in the test examples 1 and 2 in which the grooves 33 are shallow and have a depth h=8 μm, leakage did not occur even though 1,000 hours had passed. Further, in the test example 3 in which the grooves 33 are shallow and have a depth h=13 μm, leakage did not occur for 550 hours. In the test examples 4 and 5 in which the depths h of the grooves 33 are respectively h=16 μm, 26 μm, leakage occurred in a relatively short period of time.

In this manner, it was found from the results of the above-described evaluation tests of static leakage prevention performance that as the grooves 33 are shallower, that is, a value of the depth h of the grooves 33 is smaller, static leakage can be suppressed, so that static leakage prevention performance becomes higher. More specifically, it was found from the evaluation tests of static leakage prevention performance that static leakage prevention was favorable in order of the test example 5, the test example 4, the test example 3, the test example 2 and the test example 1 among the test examples 1 to 5.

Further, the present inventor manufactured sealing apparatuses 1 according to the embodiment of the present disclosure including grooves 33 having respective depths h and the numbers of threads n (test examples 11 to 21) and performed evaluation tests of static leakage prevention performance of the sealing apparatuses 1 in a similar manner to the test examples 1 to 5 described above. In the test example 11, the grooves 33 were set such that the depth h=58 μm, and the number of threads=4. In the test example 12, the grooves 33 were set such that the depth h=52 μm, and the number of threads=4. In the test example 13, the grooves 33 were set such that the depth h=26 μm, and the number of threads=24. In the test example 14, the grooves 33 were set such that the depth h=15 μm, and the number of threads=43. In the test example 15, the grooves 33 were set such that the depth h=15 μm, and the number of threads=4. In the test example 16, the grooves 33 were set such that the depth h=13 μm, and the number of threads=24. In the test example 17, the grooves 33 were set such that the depth h=10 μm, and the number of threads=65. In the test example 18, the grooves 33 were set such that the depth h=10 μm, and the number of threads=4. In the test example 19, the grooves 33 were set such that the depth h=7 μm, and the number of threads=99. In the test example 20, the grooves 33 were set such that the depth h=7 μm, and the number of threads=73. In the test example 21, the grooves 33 were set such that the depth h=4 μm, and the number of threads=24.

Results of the evaluation tests of static leakage prevention performance are indicated in Table 2 below.

TABLE 2

|  | Test example 11 | Test example 12 | Test example 13 | Test example 14 | Test example 15 | Test example 16 | Test example 17 | Test example 18 | Test example 19 | Test example 20 | Test example 21 |
|---|---|---|---|---|---|---|---|---|---|---|---|
| Depth h (μm) | 58 | 52 | 26 | 15 | 15 | 13 | 10 | 10 | 7 | 7 | 4 |
| The number of threads n | 4 | 4 | 24 | 43 | 4 | 24 | 65 | 4 | 99 | 73 | 24 |
| Leakage occurrence period (hr) | 24 | 45 | 34 | 110 | No leakage | 550 | No leakage | No leakage | No leakage | No leakage | No leakage |

As indicated in Table 2, in the sealing apparatuses 1 (test examples 14 and 15) in which the depth h of the grooves 33 is h=15 μm, there was a sealing apparatus in which leakage did not occur and occurrence of leakage was not confirmed for 1,000 hours. Further, in the test example 14 in which the depth of the grooves h=15 μm and the number of threads n=43 which is larger than the number of threads n=24 in the test example 13 in which the depth h=26 μm, the leakage occurrence period increased approximately three times of that in the test example 13. In this manner, in the sealing apparatus 1 according to the embodiment of the present disclosure, it can be said that the depth h of the grooves 33 of the slinger 3 is preferably equal to or less than 15 μm.

As the number of threads n of the grooves 33 increases, it can be considered that static leakage is more likely to occur because the number of locations of space which penetrates through the slinger contact portion 23 and the lip contact portion 32 increases. The results of the evaluation tests in the test examples 14 and 15 support this idea. That is, while leakage did not occur and occurrence of leakage was not confirmed for 1,000 hours in the test example 15 (n=4) in which the number of threads is smaller, leakage occurred after 110 hours in the test example 14 (n=43) in which the number of threads is larger, although the depth of the grooves is the same and h=15 μm. Meanwhile, as indicated in Table 2, in the sealing apparatuses 1 (test examples 17 to 20) having the grooves 33 whose depths h=10 μm, 7 μm, it was found that leakage did not occur regardless of the number of threads of the grooves 33. While the depth h of the grooves 33 is both h=10 μm in the test examples 17 and 18, and the number of threads n of the grooves 33 in the test example 17 is n=65, and the number of threads n of the grooves 33 in the test example 18 is n=4, leakage occurred neither in the test example 17 nor 18, and occurrence of leakage was not confirmed for 1,000 hours.

In this manner, it was found from Table 2 that if the depth h of the grooves 33 is smaller (shallow) than a specific value (threshold), it is possible to prevent static leakage regardless of the number of threads n of the grooves 33 in the sealing apparatus 1. It can be said from the results of the evaluation tests of static leakage prevention performance indicated in Table 2 that, in the sealing apparatus 1, if the depth h of the grooves 33 of the slinger 3 is equal to or less than 10 μm, it is possible to prevent static leakage regardless of the number of threads n of the grooves 33. Therefore, in the sealing apparatus 1 according to the embodiment of the present disclosure, the depth h of the grooves 33 of the slinger 3 is preferably equal to or less than 10 μm.

Note that the above-described depth h of the grooves 33 is a maximum distance between the grooves 33 and a portion of the end-face lip 21 which covers the grooves 33. That is, in the case where the end-face lip 21 does not enter inside the grooves 33, the depth h of the grooves 33 is a depth of the grooves 33 itself. Meanwhile, in the case where the end-face lip 21 enters inside the grooves 33, for example, in the case where a tip 21a of the end-face lip 21 enters inside the grooves 33, the depth h of the grooves 33 is a maximum distance between a portion of the end-face lip 21 which enters inside the grooves 33 and the grooves 33.

In this manner, according to the sealing apparatus 1 according to the embodiment of the preset disclosure, it is possible to prevent static leakage of the target to be sealed without increasing sliding resistance with respect to the shaft 52 (slinger 3).

While the preferred embodiments of the present disclosure have been described above, the present disclosure is not limited to the above-described sealing apparatuses 1 according to the embodiments and may incorporate any aspect included in the concept of the present disclosure and the scope of the claims. Further, the respective components may be selectively combined as appropriate so as to provide at least part of the above-described problems and effects. Further, for example, the shapes, materials, arrangement, sizes, or the like, of the respective components in the above-described embodiments can be changed as appropriate in accordance with specific usage aspect of the present disclosure.

Figure 6A:
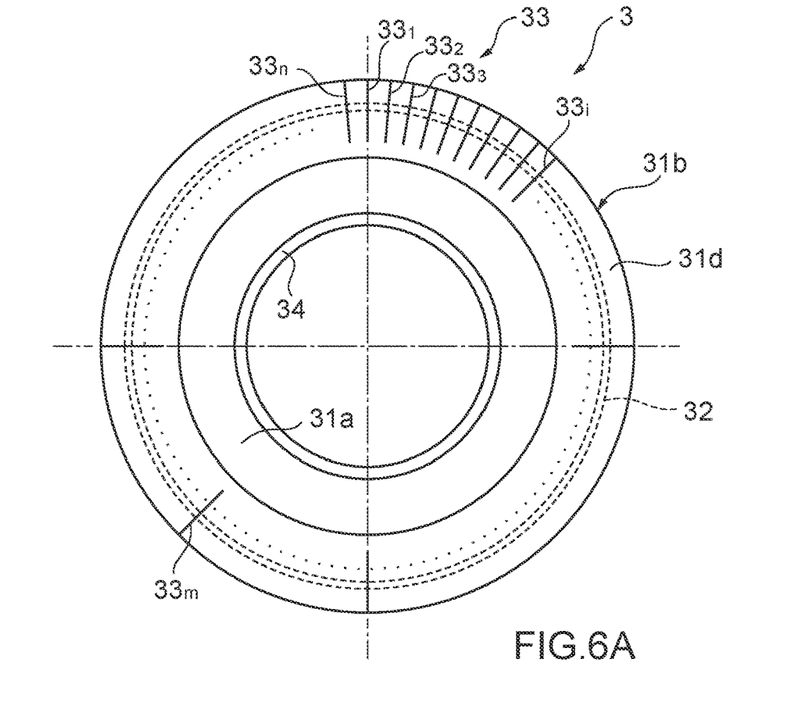
Figure 6B:
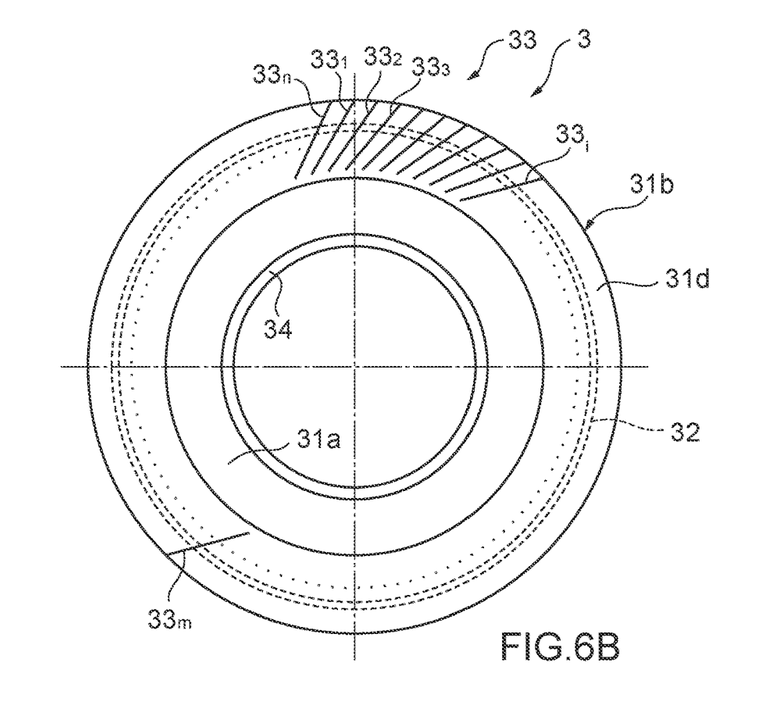
FIG. 6B illustrates another modified example of the grooves.

A shape of the grooves 33 of the slinger 3 is not limited to the shape in a spiral manner (swirl shape) illustrated in FIGS. 4A and 4B as described above and may be other shapes. For example, as illustrated in FIG. 6A, the grooves 33 may be grooves which extend in a radial manner centered on or substantially centered on the axis line x from the inner periphery side toward the outer periphery side, or, as illustrated in FIG. 6B, may be grooves which extend while tilting in the circumferential direction. In the sealing apparatus body 2, shapes of the reinforcing ring 10 and the elastic body portion 20 are not limited to the shapes described above and may be other shapes.

Further, while, in the sealing apparatus 1 according to the above-described embodiment of the present disclosure, the lip contact portion 32 which the end-face lip 21 contacts, and the grooves 33 are formed at the flange portion 31 of the slinger 3 attached to the shaft 52, the lip contact portion and the grooves of the present disclosure are not limited to those formed at the flange portion of the slinger. If the end-face lip and the grooves of the present disclosure can act as described above, any elements where the lip contact portion and the grooves of the present disclosure are formed, and any aspects and any structures of the lip contact portion and the grooves can be used.

Figure 7:
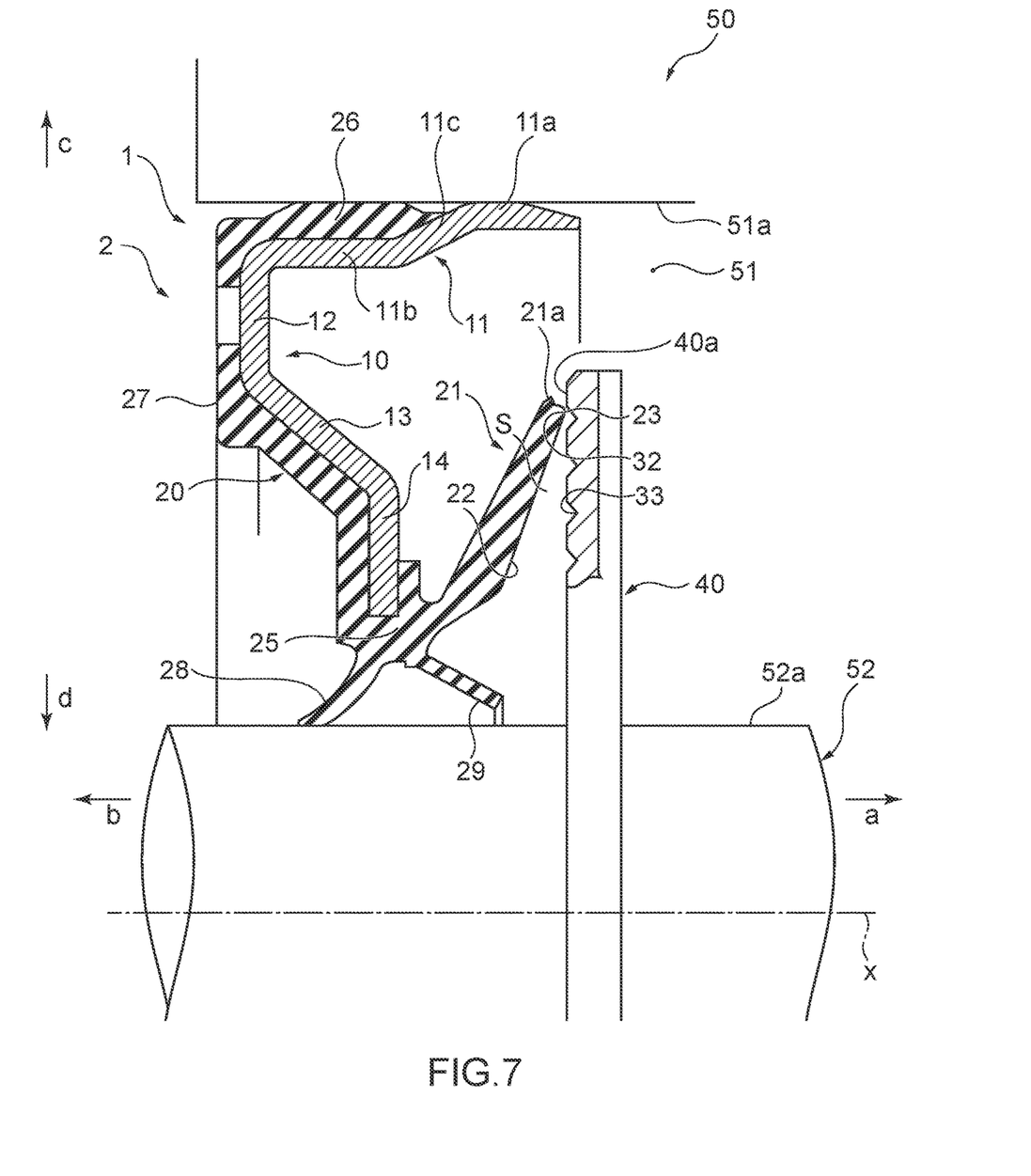
FIG. 7 is a diagram for illustrating a modified example of a contact surface on which an end-face lip contacts in the sealing apparatus.

For example, as illustrated in FIG. 7, the lip contact portion 32 and the grooves 33 may be formed at a brim portion 40 which is integrally provided at the shaft 52. The brim portion 40 is a disk-shaped portion extending in the radial direction from the outer periphery surface 52a of the shaft 52, and has an outer side surface 40a which is a plane facing outside. The outer side surface 40a of the brim portion 40 corresponds to the outer side surface 31d of the flange portion 31 of the above-described slinger 3, and the end-face lip 21 contacts the outer side surface 40a at the slinger contact portion 23, and the lip contact portion 32 and the grooves 33 are formed on the outer side surface 40a. Further, in this case, the outer periphery surface 52a of the shaft 52 corresponds to the outer periphery surface 35b of the cylindrical portion 35 of the above-described slinger 3, and the dust lip 28 contacts the outer periphery surface 52a of the shaft 52. The dust lip 28 does not have to contact the outer periphery surface 52a of the shaft 52.

Figure 8:
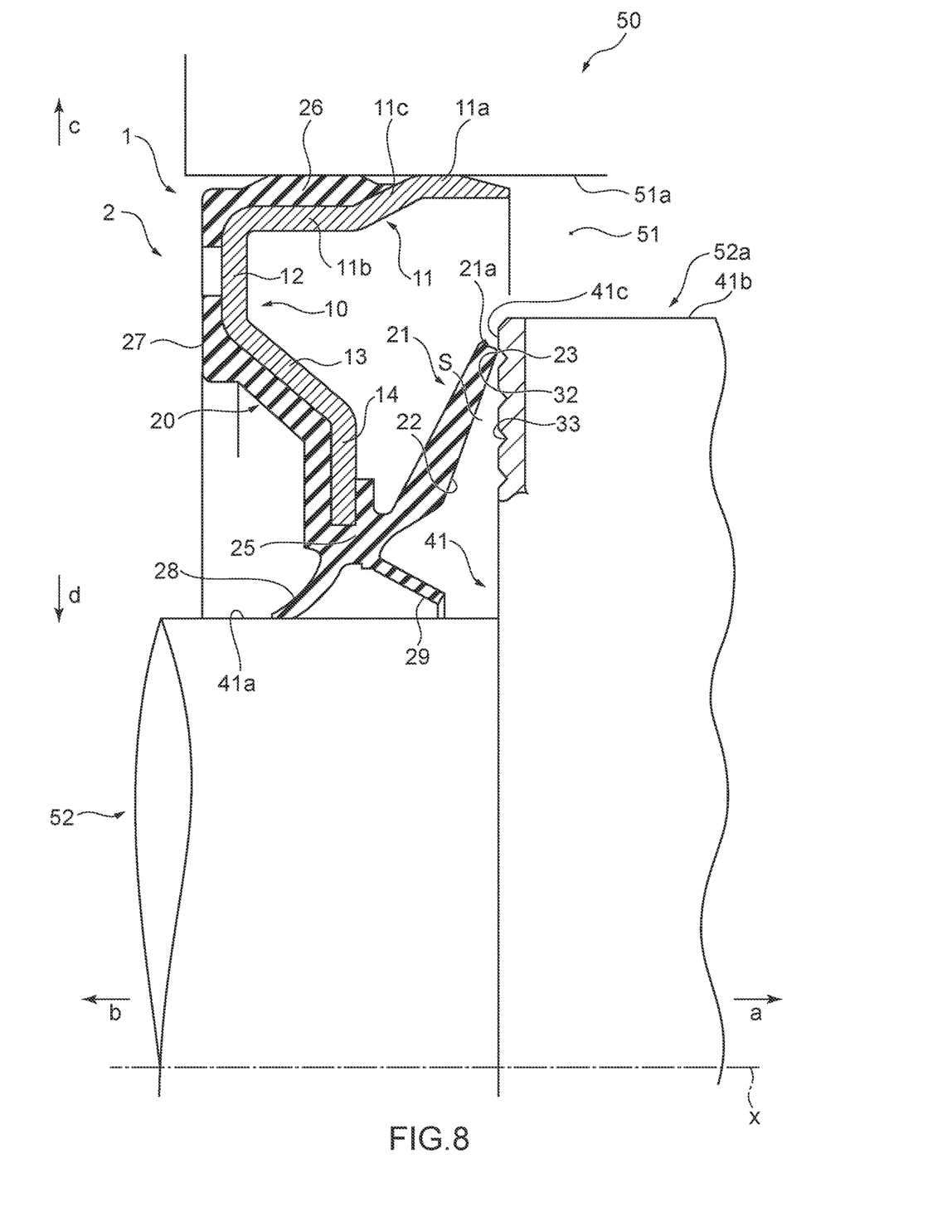
FIG. 8 is a diagram for illustrating another modified example of the contact surface on which the end-face lip contacts in the sealing apparatus.

Further, as illustrated in FIG. 8, the lip contact portion 32 and the grooves 33 may be formed at a stepped portion 41 provided at the shaft 52. The stepped portion 41 is a portion where steps are formed on the outer periphery surface 52a of the shaft 52, and has an outer side outer periphery surface 41a which is an outer side portion on the outer periphery surface 52a, an inner side outer periphery surface 41b which extends on an inner side from the outer side outer periphery surface 41a, and a stepped surface 41c connecting the outer side outer periphery surface 41a and the inner side outer periphery surface 41b. The outer side outer periphery surface 41a and the inner side outer periphery surface 41b are cylindrical surfaces, and the inner side outer periphery surface 41b extends on the outer periphery side from the outer side outer periphery surface 41a. The stepped surface 41c of the stepped portion 41 is a plane which is orthogonal or substantially orthogonal to the axis line x, and corresponds to the outer side surface 31d of the flange portion 31 of the above-described slinger 3, and the end-face lip 21 contacts the stepped surface 41c at the slinger contact portion 23, and the lip contact portion 32 and the grooves 33 are formed on the stepped surface 41c. Further, in this case, the outer side outer periphery surface 41a of the outer periphery surface 52a of the shaft 52 corresponds to the outer periphery surface 35b of the cylindrical portion 35 of the above-described slinger 3, and the dust lip 28 contacts the outer side outer periphery surface 41a of the shaft 52. The dust lip 28 does not have to contact the outer side outer periphery surface 41a of the shaft 52.

Figure 9:
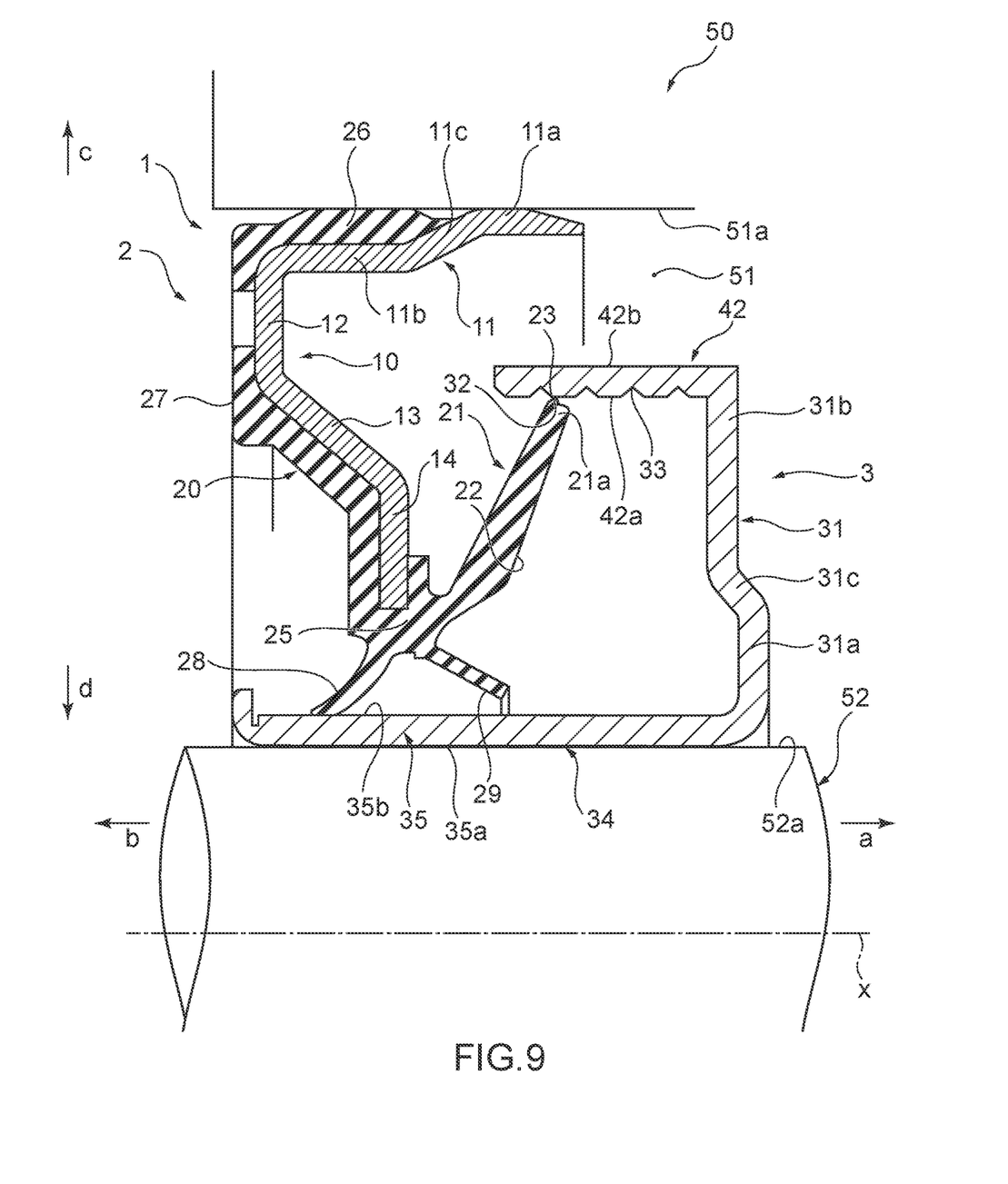
FIG. 9 is a diagram for illustrating a still another modified example of the contact surface on which the end-face lip contacts in the sealing apparatus.

Further, the end-face lip of the present disclosure is not limited to one which contacts a surface extending in the radial direction as the end-face lip 21 described above. The end-face lip of the present disclosure may be one which contacts a cylindrical surface extending in the axis line x direction from the outer periphery side or from the inner periphery side as illustrated in FIG. 9. For example, as illustrated in FIG. 9, the flange portion 31 of the slinger 3 may have an outer periphery side cylindrical portion 42 extending toward an outer side along the axis line x from the end portion on the outer periphery side of the outer periphery side disk portion 31b. An inner periphery surface 42a which is a cylindrical surface is formed on a surface on the inner periphery side of the outer periphery side cylindrical portion 42, and this inner periphery surface 42a corresponds to the outer side surface 31d of the flange portion 31 of the above-described slinger 3, the end-face lip 21 contacts the inner periphery surface 42a at the slinger contact portion 23, and the lip contact portion 32 and the groove 33 are formed on the inner periphery surface 42a. An outer periphery surface 42b which is a cylindrical surface formed on a surface on the outer periphery side of the outer periphery side cylindrical portion 42 may correspond to the outer side surface 31d of the flange portion 31 of the above-described slinger 3. In this case, the end-face lip 21 contacts the outer periphery surface 42b at the slinger contact portion 23, and the lip contact portion 32 and the grooves 33 are formed on the outer periphery surface 42b. The outer periphery side cylindrical portion 42 illustrated in FIG. 9 may be respectively formed at the brim portion 40 and the stepped portion 41 respectively illustrated in FIG. 7 and FIG. 8. That is, the above-described inner periphery surface 42a or the outer periphery surface 42b may be respectively formed at the brim portion 40 and the stepped portion 41, and the lip contact portion 32 and the grooves 33 may be formed on the inner periphery surface 42a or the outer periphery surface 42b. In the case where the end-face lip 21 contacts the outer periphery surface 42b, an extending direction of the end-face lip 21 at the elastic body portion 20 is different from that illustrated in FIGS. 1, 2 and 5, and the end-face lip 21 extends while a diameter becomes smaller as progress from the outer side toward the inner side in the axis line x direction.

Further, while description has been provided that the sealing apparatus 1 according to the present embodiments are applied to a crank hole of an engine, an application target of the sealing apparatus according to the present disclosure is not limited to this, and the present disclosure can be applied to all configurations which can utilize effects provided by the present disclosure, such as other vehicles, general-purpose machine and industrial machine. For example, the present disclosure can be used in a transmission, a reducer, a motor and a differential mechanism.

What is claimed is:

1. A sealing apparatus for sealing an annular gap between a shaft and a hole into which the shaft is to be inserted, the sealing apparatus comprising:
    a sealing apparatus body fitted into the hole; and
    a slinger attached to the shaft,
    wherein the sealing apparatus body includes a reinforcing ring annular around an axis line, and an elastic body portion which is formed with an elastic body attached to the reinforcing ring and which is annular around the axis line,
    the slinger includes a flange portion which is a portion extending toward an outer periphery side and annular around the axis line,
    the elastic body portion includes an end-face lip which is a lip extending toward one side in an axis line direction, contacting a surface of the flange portion on an other side in the axis line direction, and annular around the axis line,
    at least one shallow groove is formed on the surface of the flange portion of the slinger on the other side, and
    a depth of each of the shallow grooves is equal to or less than 15 μm to have no static leakage at least for 550 hours.

2. The sealing apparatus according to claim 1, wherein the slinger includes a plurality of shallow grooves.

3. The sealing apparatus according to claim 1, wherein the shallow groove intersects with a portion where the seal lip contacts.

4. The sealing apparatus according to claim 1, wherein the depth of each of the shallow grooves is equal to or less than 10 μm.

* * * * *